US011160417B2

(12) United States Patent
Loew (10) Patent No.: US 11,160,417 B2
(45) Date of Patent: Nov. 2, 2021

(54) BURNER SYSTEM FOR A COOKING APPLIANCE, AND METHOD FOR OPERATING A BURNER SYSTEM FOR A COOKING APPLIANCE

(71) Applicant: RATIONAL INTERNATIONAL AG, Heerbrugg (CH)

(72) Inventor: Florian Loew, Cernay (FR)

(73) Assignee: RATIONAL INTERNATIONAL AG

( * ) Notice: Subject to any disclaimer, the term of this patent is extended or adjusted under 35 U.S.C. 154(b) by 196 days.

(21) Appl. No.: 16/464,653

(22) PCT Filed: Nov. 22, 2017

(86) PCT No.: PCT/EP2017/080106
§ 371 (c)(1),
(2) Date: May 28, 2019

(87) PCT Pub. No.: WO2018/095988
PCT Pub. Date: May 31, 2018

(65) Prior Publication Data
US 2019/0343330 A1 Nov. 14, 2019

(30) Foreign Application Priority Data

Nov. 25, 2016 (DE) ..................... 10 2016 122 778.1
Nov. 25, 2016 (DE) ..................... 10 2016 122 780.3

(51) Int. Cl.
*A47J 37/06* (2006.01)
*F23C 6/04* (2006.01)
(Continued)

(52) U.S. Cl.
CPC ............. *A47J 37/0682* (2013.01); *F23C 6/04* (2013.01); *F23C 13/06* (2013.01); *F23D 14/18* (2013.01);
(Continued)

(58) Field of Classification Search
CPC ........ F23C 6/04; F23C 13/06; F23C 2900/13; F23C 2900/06041; F23D 14/18;
(Continued)

(56) References Cited

U.S. PATENT DOCUMENTS 4,083,355 A * 4/1978 Schwank ................ F23D 14/14
126/39 J
6,349,714 B1 * 2/2002 Hurley .................... F24C 3/085
126/39 J
(Continued)

FOREIGN PATENT DOCUMENTS

CN 104315515 A * 1/2015 ............ F23D 14/14
DE 4339012 6/1995 ............ F23D 14/22
(Continued)

OTHER PUBLICATIONS

International Preliminary Report on Patentability (w/translation) issued in application No. PCT/EP2017/080106, dated May 28, 2019 (20 pgs).

(Continued)

*Primary Examiner* — David J Laux
*Assistant Examiner* — Nikhil P Mashruwala
(74) *Attorney, Agent, or Firm* — Hayes Soloway P.C.

(57) ABSTRACT

A burner system for a cooking device has at least one burner surface wherein the at least one burner surface is designed in such a way that the burner system has a low minimum power density with homogeneous temperature distribution at the same time. In a first aspect, the burner system includes a fuel supply and a first burner surface for burning the fuel that is provided downstream of the fuel supply. The burner system includes a second burner surface for afterburning that is separate from the first burner surface and is provided downstream from the first burner surface. Moreover, a method for operating the burner system is shown.

16 Claims, 5 Drawing Sheets

(51) Int. Cl.
*F23C 13/06* (2006.01)
*F23D 14/18* (2006.01)
*F24C 3/06* (2006.01)
*F24C 3/08* (2006.01)
*F24C 3/10* (2006.01)

(52) U.S. Cl.
CPC .............. *F24C 3/067* (2013.01); *F24C 3/085* (2013.01); *F24C 3/103* (2013.01); *F24C 3/106* (2013.01); *F23C 2900/06041* (2013.01); *F23C 2900/13001* (2013.01); *F23C 2900/13002* (2013.01); *F23D 2203/107* (2013.01); *F23D 2900/00001* (2013.01)

(58) Field of Classification Search
CPC ..... F23D 2203/107; F23D 2900/00001; F24C 3/06; F24C 3/10
See application file for complete search history.

(56) References Cited

U.S. PATENT DOCUMENTS

| | | | | |
|---|---|---|---|---|
| 6,609,513 | B2 * | 8/2003 | Yamada | F24C 3/067 126/39 J |
| 8,573,968 | B2 | 11/2013 | Kaupert | 431/350 |
| 9,447,968 | B2 * | 9/2016 | Satoh | F23C 3/00 |
| 10,584,869 | B2 * | 3/2020 | Lee | F23D 11/36 |
| 2006/0141412 | A1 | 6/2006 | Masten et al. | 431/326 |
| 2008/0261163 | A1 | 10/2008 | Brenner et al. | 431/354 |
| 2020/0022524 | A1 * | 1/2020 | Lee | F23D 14/28 |

FOREIGN PATENT DOCUMENTS

| | | | |
|---|---|---|---|
| DE | 102004037689 | 3/2006 | ............. F23D 14/22 |
| DE | 102006010375 | 9/2007 | ............. F23D 14/46 |
| DE | 102008019854 | 10/2009 | ............. F23D 14/22 |
| EP | 0469251 | 2/1992 | ............. F23D 14/18 |
| EP | 0757207 | 2/1997 | ............... F23N 5/02 |
| JP | H05157211 | 6/1993 | ................ F23C 6/04 |

OTHER PUBLICATIONS

International Search Report and Written Opinion (w/translations) issued in application No. PCT/EP2017/080106, dated Apr. 11, 2018 (25 pgs).

* cited by examiner

BURNER SYSTEM FOR A COOKING APPLIANCE, AND METHOD FOR OPERATING A BURNER SYSTEM FOR A COOKING APPLIANCE

FIELD OF THE DISCLOSURE

The disclosure relates to a burner system for a cooking device as well as a method for operating a burner system for a cooking device. The disclosure relates in particular to burner systems in which heat generated through the combustion of gas serves to heat a surface that comes into contact with the food item to be cooked directly (thus without intermediate heat exchanger, e.g. but by means of ribs or studs on the surface).

BACKGROUND

Such burner systems are well-known in cooking devices. They are very suitable for heating large quantities of food item to be cooked as burners have large maximum power densities. If such large power densities are not required, for example if sensitive food items are to be cooked, the power density of the burner system must be reduced.

At the same time, it is important that burner systems have a homogeneous temperature distribution, i.e. that the heat generated by the burner system is delivered uniformly in order to avoid hotspots. This is particularly necessary in cooking devices comprising a crucible that can be used for both cooking and frying. Heating the food item to be cooked uniformly is only ensured with a homogeneous temperature distribution.

Problematically, the specific power density, i.e. power densities per surface unit, of known burner systems cannot be reduced arbitrarily as a certain minimum specific power density is required for the combustion of the fuel. Below this minimum specific power density, complete combustion does not take place or the flame is extinguished. Therefore, it is common for individual flames to be located further apart from each other in order to reduce the overall power density of the burner system. In this way, a specific power density that is on average lower is achieved over the entire surface of the burner system. However, the areas of the heated surfaces that are situated between the flames then have a lower temperature than the area directly above the flames which can result in a non-uniform temperature distribution and thus non-uniform heating of the food item to be cooked.

So far, only burner systems are known that either have a low power density over the entire crucible base, but wherein hotspots form, or such burner systems that heat the crucible base uniformly but have a higher minimum power density.

SUMMARY

Thus, there is a need to provide a burner system as well as a method for operating such a burner system that enable low power densities with homogeneous temperature distribution at the same time.

The object is achieved by means of a burner system for a cooking device comprising at least one burner surface, wherein said at least one burner surface is configured in such a way that the burner system has a low minimum power density with homogeneous temperature distribution at the same time, in this way, it is possible to greatly reduce the specific power density of the burner system without influencing the homogeneity of the temperature distribution. This facilitates the provision of burner systems with homogeneous temperature distribution which can be regulated nevertheless over the wide range of the power density.

In a first aspect of the disclosure, the burner system has a fuel supply and a first burner surface for the combustion of fuel that is provided downstream of the fuel supply, wherein the burner system comprises a second burner surface for afterburning which is separate from the first burner surface and is provided downstream from the first burner surface. In this regard, the term "downstream" is understood to relate to the flow of the fuel or the exhaust gas generated by the combustion of the fuel. In this regard, "fuel" is understood to mean both a combustible air-gas mixture and combustible gas.

As a second burner surface for afterburning is provided, it is possible to reduce the power density on the first burner surface to below the necessary power density for complete combustion. In the case of incomplete combustion, as then takes place on the first burner surface, gases containing carbon monoxide form which are not to be released into the environment of the cooking device. These gases, in particular carbon monoxide, are oxidized further through afterburning on the second burner surface and converted into normal safe combustion exhaust gases. Therefore, the burner system can make a uniform combustion with a low specific power density possible. As a result, a homogeneous temperature distribution can be realized despite the very low specific power density.

Preferably, the first burner surface and/or the second burner surface are provided with a catalyst material, thereby enabling the further reduction of the specific power density. To this end, the catalyst material interferes with the reaction kinetics of the combustion and results in favoring certain reaction paths, for example the favored formation of carbon dioxide instead of carbon monoxide. Thus, it is possible that the amount of carbon monoxide formed on the first burner surface is reduced and removed from the exhaust gases reliably by means of afterburning. To this end, the catalyst material can be a noble metal such as platinum, palladium and/or rhodium.

For example, an ignition electrode is provided on the first burner surface for igniting the fuel, thereby making a simple ignition of the fuel possible. In this regard, the ignition electrode may also be used for flame monitoring.

In an embodiment of the disclosure, a first air supply is provided upstream of the first burner surface, thus making it possible to supply air to the first burner surface reliably.

Preferably, a second air supply is provided upstream of the second burner surface in such a way that it can supply air to the second burner surface. More specifically, the exhaust gas formed during the combustion on the first burner surface can be mixed with air by means of the second air supply upstream of the second burner in order to optimize afterburning at the second burner surface.

For example, an exhaust chamber is configured between the first burner surface and the second burner surface, wherein the second air supply opens into the exhaust chamber so that the air supplied by means of the second air supply can be effectively mixed with the exhaust gas.

In an embodiment of the disclosure, several first burner surfaces are provided which are covered by the second burner surface. In this way, the burner system can be configured to save space. For example, only a second air supply is necessary in this case. For example, the first burner surfaces can be circular and each comprise its own ignition electrode.

The first burner surface can be part of a radial burner or part of a surface burner so that both types of burners can be employed.

In particular, the second burner surface is part of a surface burner in order to improve the homogeneity of the temperature distribution further.

Preferably, the first burner surface and/or the second burner surface are each configured on a burner body, such as a metal-fiber mat, a mesh, in particular a wire mesh, a knitted material, a porous ceramic and/or a perforated sheet, thereby enabling the combustion to be controlled and stabilized locally on each burner surface.

In an embodiment of the disclosure, the burner system comprises a cylindrical housing with two end faces and the first burner body is also configured cylindrically within the housing, wherein a space is configured between the first burner body and the housing. In this way, effective and space-saving combustion is possible on the first burner surface. To this end, the housing and/or burner body may have a circular cylindrical form.

Preferably, the fuel supply opens into the space so that the first burner surface is reliably supplied with fuel.

For example, the housing is closed on the downstream end face by the second burner surface, thereby ensuring that all exhaust gases formed during the combustion on the first burner surface pass completely through the second burner surface.

The second air supply can be provided centrally on the upstream end face of the housing, thus achieving a particularly compact and space-saving construction of the burner system.

In another embodiment of the disclosure, the burner system comprises a distribution plate, thereby enabling heat generated at the burner surfaces to be delivered uniformly. The distribution plate can be made of metal-fiber mat, a mesh, in particular a wire mesh, a knitted material, a porous ceramic and/or a perforated sheet. The distribution plate can also be provided with a catalyst material in order to improve the quality of the exhaust gas further.

The second burner surface constitutes the distribution plate, for example, thus saving on components.

In a second aspect of the disclosure, the burner system has a burner body that comprises said at least one burner surface on which several combustion sites are provided, wherein the combustion sites are arranged in a point lattice and each combustion site comprises a separate fuel supply and a separate air supply. To this end, the point lattice is particularly uniform. The fuel-air mixture is formed at the combustion sites. In particular, the entire crucible base to be heated is covered by the burner body in the main completely.

As the many combustion sites are distributed over the burner surface particularly uniformly, the temperature distribution of the burner body is very homogeneous and does not comprise hotspots. Furthermore, a large homogeneity of the power densities of the combustion sites is possible as each combustion site comprises a separate fuel supply. The separate fuel supplies ensure that the same amount of fuel is combusted at each combustion site.

Preferably, the point lattice extends over the entire burner surface so that an area as large as possible can be used for generating heat. For example, an ignition electrode is located on the burner surface for igniting the fuel. This allows the burner system to be ignited reliably. The ignition electrode can also be used for flame monitoring.

In an embodiment of the disclosure, the burner body comprises at least a fuel channel which extends along the burner surface and passes or crosses said at least one combustion site, wherein said at least one fuel channel comprises at least one port, which is the fuel supply for each combustion site, in the area of each combustion site passed or crossed. In this way, it is possible to introduce the fuel supply easily to the combustion site directly, thus the location of combustion. This is why no fuel is lost as a result of undesired effects or imperfect flow.

Preferably, several fuel channels are provided that are arranged parallel to each other, wherein the combustion sites are located between the fuel channels. As a result, it is possible to supply the combustion sites with fuel effectively and simply. To this end, the fuel channels can comprise ports at both sides so that the combustion sites are supplied with fuel from two sides. As a result, the reliability of the burner is increased.

At least one opening, which is the air supply of each combustion site, is provided for example in the burner body in the area of each combustion site. The combustion sites can be defined by the air openings while the fuel supplies and the ports of the gas channels may be situated in the area of the openings. The openings which are ail the same size ensure that each combustion site is supplied with the same amount of air. Thus, the combustions take place at each combustion site uniformly.

Preferably, the burner body is designed be plate-like so that the openings can be formed easily.

In an embodiment of the disclosure, the burner body is made of two half shells. To this end, openings and already half pipes can be formed on each of the half shells for the fuel channels. The half shells can be produced by means of deep drawing. A simple and cost-efficient production is possible through the production of the burner from two half shells.

In a variant, the burner system comprises a stabilization element for the stabilization of the combustion, wherein the stabilization element is located on the burner surface. To this end, the stabilization element can be a metal-fiber met a mesh, in particular a wire mesh, a fine wire grating, a knitted material and/or a porous ceramic. The combustion is localized and stabilized on the burner surface by the stabilization element, thereby making the homogeneity of the generated temperature distribution and a lower specific power density possible. To this end, the ignition electrode may be provided on the side of the stabilization element feeing away from the burner surface.

For example, the stabilization element covers all combustion sites so that the combustion takes place at all combustion sites uniformly.

Preferably, the stabilization element is provided with a catalyst material, thus making combustions at lower temperatures and therefore lower specific power densities possible. In particular, the stabilization element can be coated with the catalyst material. The catalyst material can be a noble metal such as platinum, palladium and/or rhodium.

In an embodiment of the disclosure, the burner system comprises a housing in which the burner body is located, wherein the housing on the side of the burner body facing away from the burner surface comprises an air connection so that air can be transported to all air supplies easily.

For example, the burner system comprises a distribution plate, thereby enabling the homogeneity of the temperature distribution of the burner system to be improved further. To this end, the distribution plate is made of a metal sheet, a metal-fiber mat, a mesh, in particular a wire mesh, a knitted material, a fine wire grating, a porous ceramic and/or a perforated sheet.

The stabilization element can constitute the distribution plate, thereby saving on components.

Moreover, the disclosure is solved by means of a method for operating a burner system for a cooking device, wherein fuel is combusted on a first burner surface of the burner system and the exhaust gases generated by the combustion are afterburned on a second burner surface of the burner system. As already described, the afterburning enables the burner system to be operated with a lower specific power density.

Preferably, air is supplied to the second burner surface for afterburning in order to improve the exhaust gas purifying effect of the combustion on the second burner surface.

For example, the amount of heat usable for cooking is controlled by the amount of air supplied for afterburning, thereby enabling simple and reliable control of the amount of heat usable for cooking. To this end, the amount of air supplied for afterburning can be controlled by a fan in the air supply.

In an embodiment of the disclosure, a catalyst material provided on the first burner surface and/or on the second burner surface enables complete combustion at lower temperatures than would be the case without the catalyst material. In this way, lower specific power densities can be achieved.

DESCRIPTION OF THE DRAWINGS

Additional features and advantages of the disclosure can be found in the following description as well as the attached drawings to which reference is made. In the drawings.

DETAILED DESCRIPTION

Figure 1:
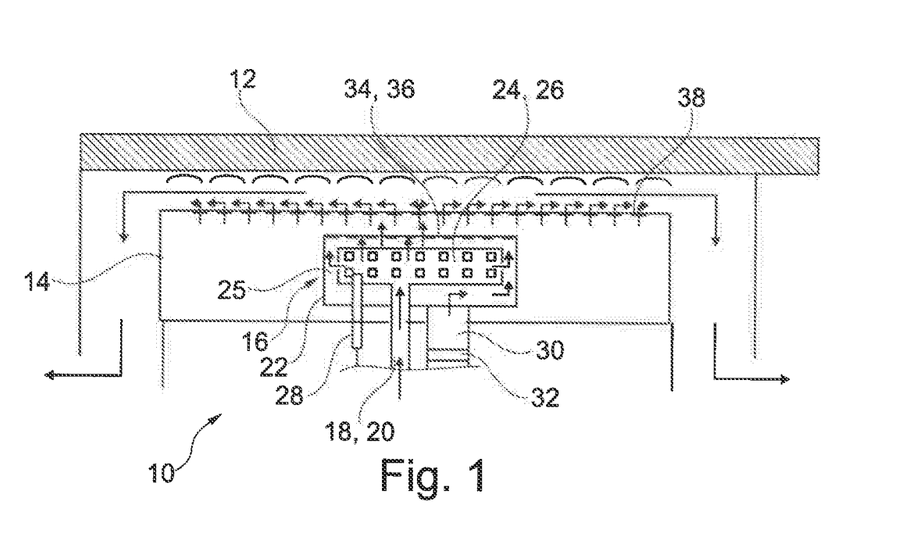
FIG. 1 shows a schematic side view of a burner system according to the disclosure in accordance with a first aspect of the disclosure.

In FIG. 1, a burner system 10 is shown for a cooking device according to a first aspect of the disclosure.

The cooking device is a cooking device comprising a crucible that is intended for professional use in restaurants, canteens and commercial kitchens. In the crucible, large amounts of liquid food items can be prepared or food items can be fried separately.

The burner system 10 is located below the crucible, of which only the crucible base 12 is shown in FIG. 1, and therefore heats the crucible base 12.

The burner system 10 comprises a burner box 14 in which a burner 16 is located.

The burner system 10 has a fuel supply 18 that opens into the burner 16. As a result of the fuel supply 18, fuel can flow into the burner 16 and be combusted there. The exhaust gas generated during combustion is then directed in the direction of the crucible base 12 before exiting and being removed from the burner 16. Thus, a flow direction of the fuel and the exhaust gas can be determined within the burner system 10. The flow direction is indicated by arrows in the figures.

A premixed combustible air-gas mixture or only combustible gas can be supplied to the burner 16 as fuel. If the burner 16 is supplied only combustible gas by the fuel supply 18, the burner 16 also comprises a first air supply 20 which supplies the burner 16 the air required for combustion.

The first air supply 20 can be a simple opening to the environment. It is also conceivable, that a fan is located in the first air supply 20 for supplying fresh air.

In the shown embodiment, a combustible air-gas mixture is supplied to the burner 16 so that the fuel supply 18 also serves as a first air supply 20.

The combustible air-gas mixture is previously generated, for example, in a composite system comprising a valve, a venturi and a fan.

The burner 16 comprises a circular cylindrical housing 22 with two end faces, in said housing 22 a similarly circular cylindrical first burner body 24 is provided. A space 25 is formed between the housing 22 and the first burner body 24.

The cylindrical form of the burner body 24 results in the burner body 24 expanding less during operation and thus in more stability.

The first burner body 24 is designed as a perforated sheet in the embodiment shown in FIG. 1. It is also conceivable that the first burner body 24 is a metal-fiber mat, a mesh, in particular a wire mesh, a knitted material or a porous ceramic.

The first burner surface 26 is configured on the first burner body 24, said burner surface 26 is thus also circular cylindrical and can also be coated with a catalyst material. The catalyst material can be a noble metal such as platinum, palladium and/or rhodium.

The first burner body 24 comprising the first burner surface 26 is therefore designed as a radial burner.

The fuel supply 18 and thus also the first air supply 20 open into the center of the first burner body 24 on one of the end faces of the housing 22 in the housing 22 so that the first burner surface 26 is provided downstream of the fuel supply 18 and the first air supply 20. This end face is thus the upstream end face of the housing 22.

Similarly, the burner 16 comprises an ignition electrode 28, which is provided on the first burner surface 26, and can also be used to monitor the flame on the first burner surface 26.

A second air supply 30 also opens into the housing 22 on the upstream end face of the housing 22, wherein a fan 32 can be provided in the second air supply 30.

The housing 22 is closed by a second burner surface 34 on its downstream end face.

The second burner surface 34 is provided on a second burner body 36 which is a metal-fiber mat in the shown embodiment. It is however conceivable that the second burner body 36 is a mesh, in particular a wire mesh, a knitted material, a porous ceramic and/or a perforated sheet.

The burner box 14 is provided with a distribution plate 38 downstream of the burner 16, i.e. above the burner 16 in the drawing in FIG. 1. The distribution plate 38 virtually closes the entire burner box 14 towards the crucible base 12.

The distribution plate 38 can be a metal-fiber mat, a mesh, in particular a wire mesh, a knitted material, a porous ceramic, perforated sheet or a plate.

In the shown embodiment, the distribution plate 38 is also coated with a catalyst material.

Fuel, thus an air-gas mixture in the shown embodiment, is supplied to the burner 16 by means of the fuel supply 18 in order to operate the burner system 10.

The air-gas mixture is ignited by means of the ignition electrode 28 and combusted at the first burner surface 26. The exhaust gases that are generated here flow in the direction of the downstream end face of the housing 22.

The flow of the air-gas mixture or the exhaust gas runs in the area of the burner body 24 radially outwards through the first burner surface 26 towards the housing 22. Combustion then takes place on the first burner surface 26.

It is, of course, also conceivable that the flow runs axially along the burner surface 26 or that the flow is a mixture of axial and radial flow.

As a result of the catalyst material on the first burner surface 26, carbon dioxide instead of carbon monoxide is formed preferentially so that almost complete combustion is already possible at low temperatures. Therefore, a small amount of supplied fuel is sufficient to maintain combustion, thereby achieving a low specific power density.

Air is supplied to the housing 22 by means of the second air supply 30. The air mixes with the exhaust gas downstream of the first burner body 24, said exhaust gas being formed during the combustion on the first burner surface 34.

This air-exhaust gas mixture then passes the second burner surface 34 and is afterburned there as a result of the catalyst material on the second burner surface 34.

It is possible to dispense with an ignition using an ignition electrode on the second burner surface 34 due to the high temperature of the exhaust gas.

After the air-exhaust gas mixture has been afterburned, it flows through the distribution plate 38. The distribution plate 38 allows the exhaust gas to flow out uniformly against the crucible base 12 on the one hand and also delivers radiant heat uniformly to the crucible base 12 on the other hand.

It is also conceivable that a sufficiently large distribution plate 38 is provided that is impermeable to gas so that the crucible base 12 is only heated by the radiant heat of the distribution plate 38.

The exhaust gas can be afterburned by the catalyst material on the distribution plate 38 further to thus reduce the concentration of carbon monoxide in the exhaust gas.

The temperature of the exhaust gas strongly depends on the amount of air that is mixed with the exhaust gas by means of the second air supply 30 as the air flowing through the second air supply 30 cools the exhaust gas. The amount of air and thus also the temperature of the exhaust gas can be controlled by controlling the speed of the fan 32 in the second air supply 30. Therefore, the amount of heat usable for cooking or the power density of the burner system 10 is also is controlled by the amount of air supplied for afterburning.

Figure 2:
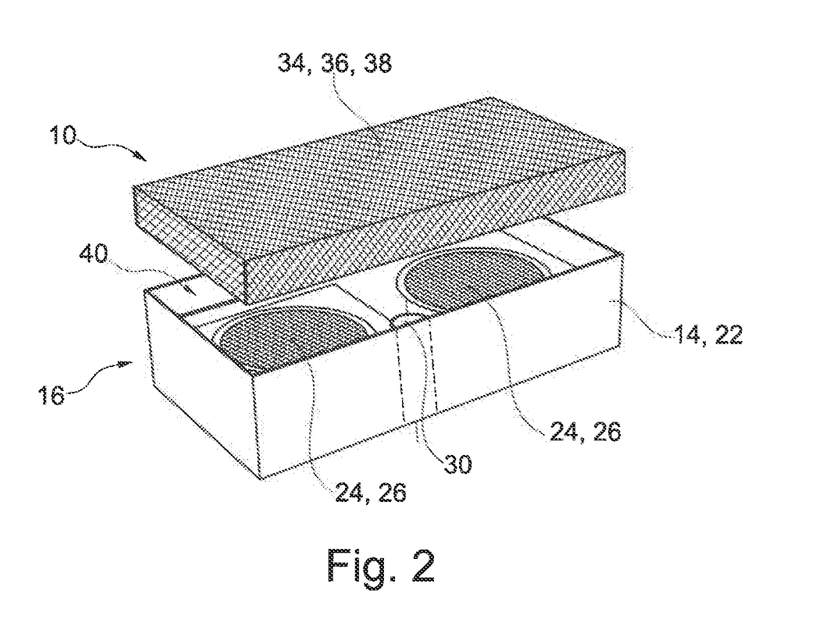
FIG. 2 shows an exploded view of a second embodiment of a burner system according to the disclosure.
Figure 3A:
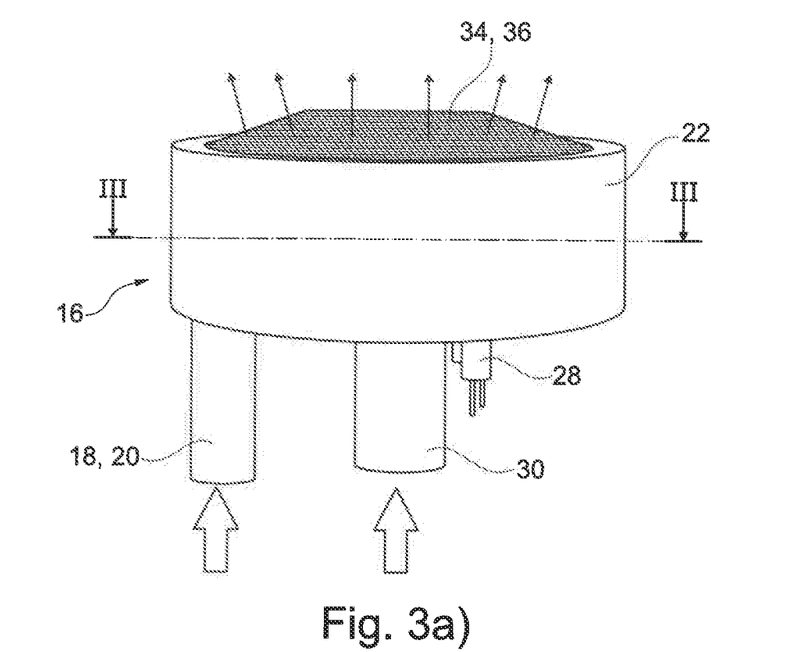
FIG. 3a shows a side view of a burner of a third embodiment of a burner system according to the disclosure.
Figure 3B:
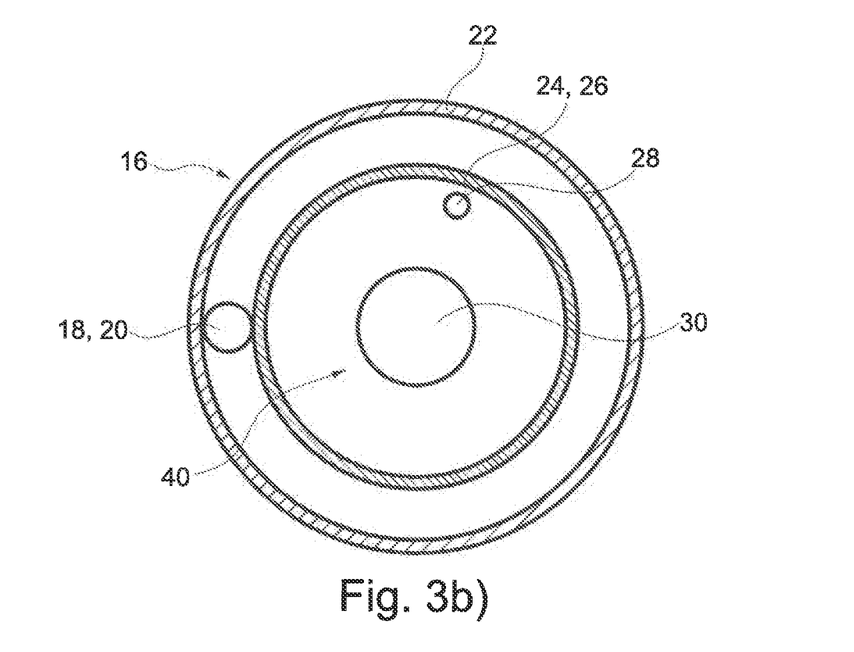
FIG. 3b shows a schematic sectional view along the axis III-III of the burner according to 3a, FIG. 4 shows parts of a burner system according to the disclosure in accordance with a second aspect of the disclosure in an exploded view.

In FIGS. 2, 3*a* and 3*b*, further embodiments of the burner system 10 are shown which substantially correspond to the first embodiment of the burner system 10. Therefore, only the differences are discussed hereinafter. Identical and functionally equivalent parts are provided with the same reference signs.

In the second embodiment shown in FIG. 2, the burner box 14 is simultaneously the housing 22 of the burner 16.

The burner 16 comprises two first burner surfaces 26 that have a circular configuration in the second embodiment and are made of a wire mesh. The first burner surfaces 26 extend in this embodiment in the radial direction and therefore are parallel to the second burner surfaces 34.

Therefore, the first burner surfaces 26 and the second burner surface 34 are each part of a surface burner.

Both first burner surfaces 26 can each comprise its own ignition electrode (not shown in FIG. 2).

In the second embodiment, the second burner surface 34 serves as a closure of the burner box 14 or the housing 22 and thus covers both first burners 26 completely. The second burner surface 34 constitutes the distribution plate 38 at the same time.

An exhaust chamber 40 is thus formed within the housing 22 between both first burner surfaces 26 and the second burner surface 34. The second air supply 30 opens into the exhaust chamber 40, said air supply 30 can therefore supply air to the second burner surface 34 particularly effectively.

Only a burner 16 of the burner system 10, which can be employed in a burner box 14, is shown in the third embodiment in FIGS. 3*a* and 3*b*.

The third embodiment differs from the first embodiment in that the fuel supply 18 opens into the space 25 between the housing 22 and the first burner body 24.

The second air supply 30 is provided centrally in the upstream end face of the housing 22 and thus also centrally in the first burner body 24. Moreover, the first burner body 24 can extend to the upstream end face of the housing 22.

Therefore, the exhaust chamber 40 is provided in the interior of the circular cylindrical first burner body 24.

The second burner body 36 is also provided as the upstream closure of the housing 22 in the third embodiment so that the air of the second air supply 30 flows against the second burner surface 34 directly.

Figure 4:
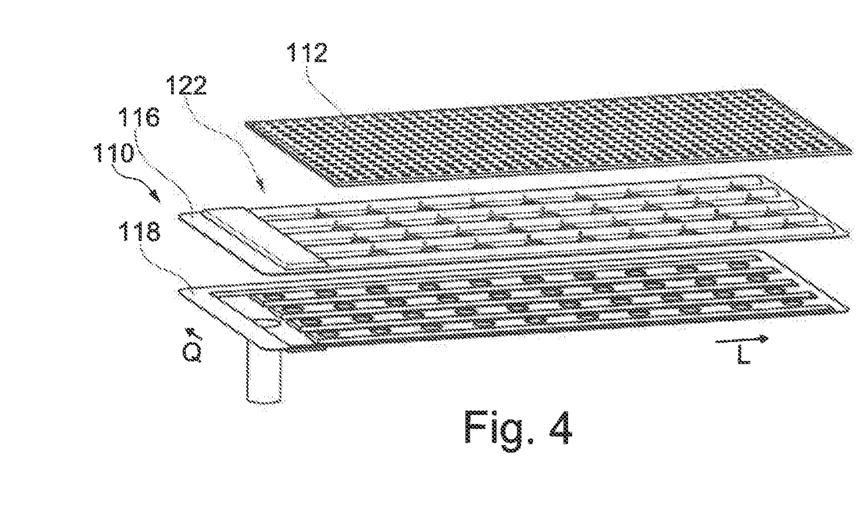

In FIG. 4, a burner surface 110 and a stabilization element 112 of a burner system 114 (FIG. 6) is shown for a cooking device according to a second aspect of the disclosure.

The burner surface 122, in particular the entire burner body 110 of the second aspect of the disclosure can be provided, for example, in place of the first burner surface 26 in the burner system 10 of the first aspect.

The cooking device is a cooking device comprising a crucible that is intended for professional use in restaurants, canteens and commercial kitchens. Large amounts of liquid food items can be prepared, food items can be fried separately, or food items can be cooked or deep-fried in auxiliary liquid cooking media.

The burner body 110 is designed to be plate-like and among other things made of two half shells, namely an upper half shell 116 and a lower half shell 118.

Both half shells 116, 118 can be produced by means of deep drawing and welded or soldered together.

The half shells 116, 118 comprise openings 120 that are arranged in a uniform point lattice. The point lattice is a rectangular point lattice in the shown embodiment. However, other point lattices such as oblique, centered rectangular, hexagonal or square point lattices are also conceivable. The designations of point lattices are based on the Bravais lattice in non-three-dimensional spaces.

The burner body 110 has a rectangular base area comprising a longitudinal side L and a traverse side Q in the embodiment. A square, hexagon or other shape is however also conceivable.

For example, the burner body 110 has base area with the aspect ratio of a standard gastronomy container, if required with a deviation of ±10%, or an aspect ratio of the known part sizes of a standard gastronomy container such as 2/1, 1/1, 2/4, 1/2, 1/4, 2/3, 1/3, 1/6 or 1/9 (each also ±10%).

The burner body 110 comprises a burner surface 122, into which the openings 120 open, on its upper side, i.e. on the side of the upper half shell 116 that is facing away from the lower half shelf 118.

Combustion sites 124 are defined on the burner surface 122 by the openings 120, thus are also located in the point lattice of the openings 120.

The point lattice extends therefore over the entire burner surface 122.

The stabilization element 112 is provided on the burner surface 122 that is a fine wire grating in the shown embodiment. It is also conceivable that the stabilization element 112 is fiber mat, a mesh, in particular a wire mesh, a knitted material and/or a porous ceramic.

The stabilization element 112 covers all combustion sites 124 and is formed as a single piece in the shown embodiment. It is also conceivable that the stabilization element 112 has multiple parts.

The stabilization element 112 is coated with a catalyst material. The catalyst material can be a noble metal such as platinum, palladium and/or rhodium.

In addition, the burner body 110 comprises several fuel channels 126 that can be formed by half pipes in the upper half shell 116 and the lower half shell 118.

A fuel supply line 128 for the fuel channels 126 extends from the lower half shell 118, i.e. on the bottom side of the burner body 110.

Figure 5:
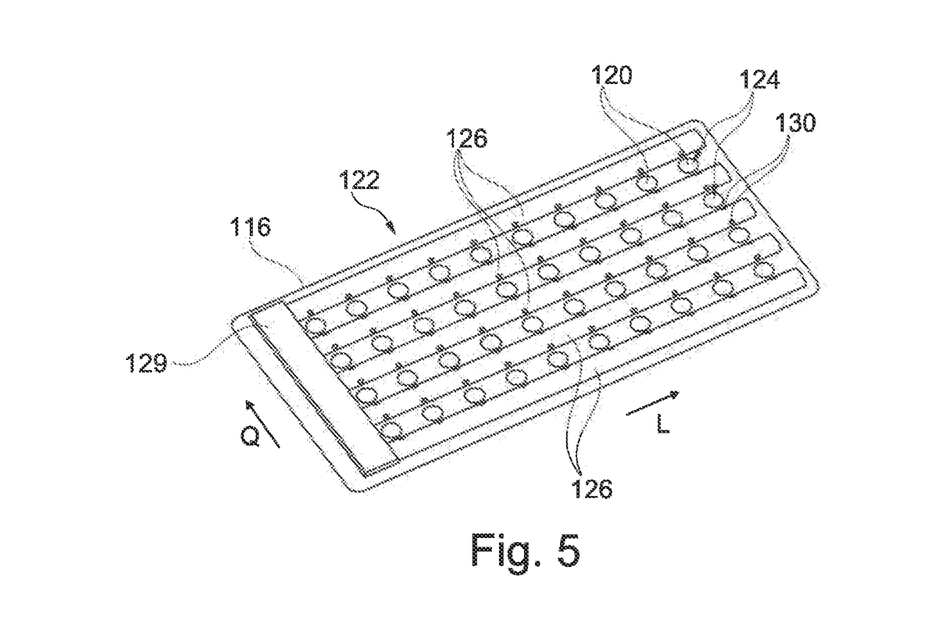
FIG. 5 shows the burner surface of the burner system according to the disclosure according to FIG. 4 in a perspective view.

The fuel channels 126 extend from a connection area 129 parallel in the longitudinal direction L through the burner surface 122, as can be seen in FIG. 5. As a result, each of the fuel channels pass several openings 120.

The openings 120 are located between the fuel channels 126 so that each opening 120 adjoins two fuel channels 126 in the traverse direction Q in the shown embodiment.

The fuel channels 126 comprise at least a port 130 in the area of each of the combustion site 124 passed, said port 130 opening towards the respective combustion site 124 and through which fuel can be supplied to the respective combustion site 124. The fuel channels 126 running in the center comprise ports 130 therefore on two sides.

The ports 130 serve as the fuel supply for the combustion sites 124. At the same time, the openings 120 serve as the air supply for the combustion sites 124 so that each combustion site 124 has a separate fuel supply and a separate air supply.

Figure 6:
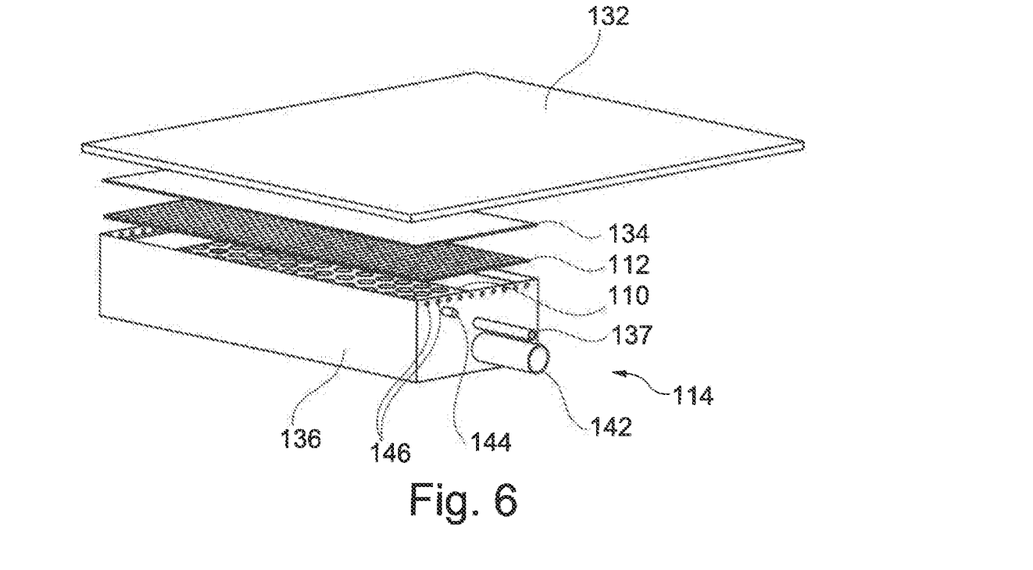
FIG. 6 shows the entire burner system of FIG. 4 according to the disclosure in an exploded view.

The entire burner system 114 is shown in FIG. 6 which is located below the crucible of the cooking device. In FIG. 6, the crucible is only shown as a part of the crucible base 132.

In particular, the entire crucible base 132 is however completely covered by the burner body 110.

In addition to the burner body 110 and the stabilization element 112, the burner system 114 comprises a distribution plate 134 and a housing 136.

The distribution plate 134 is provided above the stabilization element 112, i.e. between the stabilization element 112 and the crucible base 132. It is also conceivable that the stabilization element 112 itself constitutes the distribution plate 134.

In the shown embodiment, the distribution plate 134 is provided separately and made of a metal sheet. The distribution plate 134 can however also be a metal-fiber mat, a mesh, in particular a wire mesh, a knitted material, a porous ceramic or perforated sheet.

Figure 7:
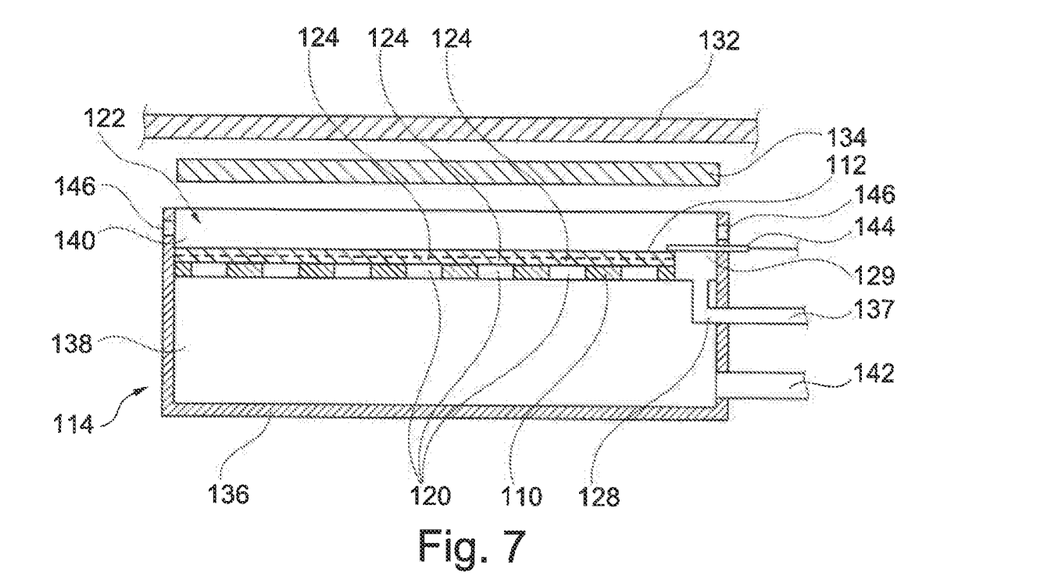
FIG. 7 shows the burner system according to FIG. 6 schematically in section.

As can be seen in FIG. 7, the burner body 110 and the stabilization element 112 are located in the housing 136.

In this case, the fuel supply line 128 of the burner body 110 is connected to a fuel inlet 137 of the burner system 114, wherein the fuel inlet 137 extends from the housing 136.

The burner body 110 divides the interior of the housing 136 into two areas, namely a fresh air area 138 and an exhaust gas area 140.

The fresh air area 138 is configured below, i.e. on the side of the burner body 110 facing away from the burner surface 122. An air connection 142 opens into the fresh air area 138 that is configured on the housing 136.

The exhaust gas area 140 is configured on the upper side of the burner body 110, i.e. on the side of the burner surface 122. An ignition electrode 144 is provided in the exhaust gas area 140 on the burner surface 122, more specifically, on the stabilization element 112.

Moreover, ports 146 for specifically removing the exhaust gases are provided in the side walls of the housing 136 in the exhaust gas area 140.

Fuel, such as natural gas, bio gas or liquid petroleum gas, is supplied to the burner system 114 through the fuel inlet 137.

The fuel flows through the fuel supply line 128, the connection area 129 and the fuel channels 126 and is metered in at the combustion sites 124 through the ports 130. The amount of fuel supplied can be controlled by a valve (not shown) in the fuel inlet 137.

The fresh air needed for combustion is supplied to the combustion sites 124 through the openings 120. The fresh air originates from the fresh air area 138 that is supplied by the air connection 142. Similarly, the amount of fresh air supplied can be controlled by a fan (not shown) in the air connection 142.

The fuel mixes with the air at the combustion sites 124 so that a combustible gas-air mixture is formed at the combustion sites 124.

For a temperature distribution as uniform as possible, all flames must be the same "size", i.e. each combustion site is supplied the same amount of fuel and fresh air. This is ensured by the ports 130 which are all identical and by the openings 120 which are all identical. However, flameless oxidation of the fuel by means of a catalyst material is also conceivable.

The gas-air mixture is ignited by the ignition electrode 144 so that combustion or oxidation occurs at each combustion site 124. The ignition electrode 144 can also be used for flame monitoring after ignition.

As the combustion sites are located on the stabilization element 112, the combustion or oxidation also occurs on the stabilization element 112.

The catalyst material of the stabilization element 112 interferes with the reaction kinetics of combustion and results in a stable combustion already taking place at low temperatures and low power densities. In addition, carbon dioxide which the can be completely burned by the fuel is formed preferentially by the catalyst material.

In other words, it is possible by means of the catalyst material to generate small oxidation areas (figuratively speaking smaller "flames" that enable stable oxidation independently from each other. Therefore, a small flame is generated at each combustion site 124 on the burner surface 122, wherein the flames are arranged uniformly in the point lattice. A particularly uniform temperature distribution of the burner system 114 is possible though the regularity of the arrangement of the flames.

The exhaust gases formed during combustion are then removed through the ports 146 for the purpose of specifically removing the exhaust gases from the housing 136.

Thus, the burner system 114 generates a very homogeneous temperature distribution that can be used to heat the crucible base 132 uniformly without any hotspots.

As a result of the good controllability of the fan and/or the gas valve, a power control of the burner system 114 of 1:20 is possible.

It is also conceivable that several burner systems 114 are arranged in a cooking device adjacent to each other or in a lattice in order to realize several different heating zones on the crucible base 132 which are controllable independently of each other.

Figure 8:
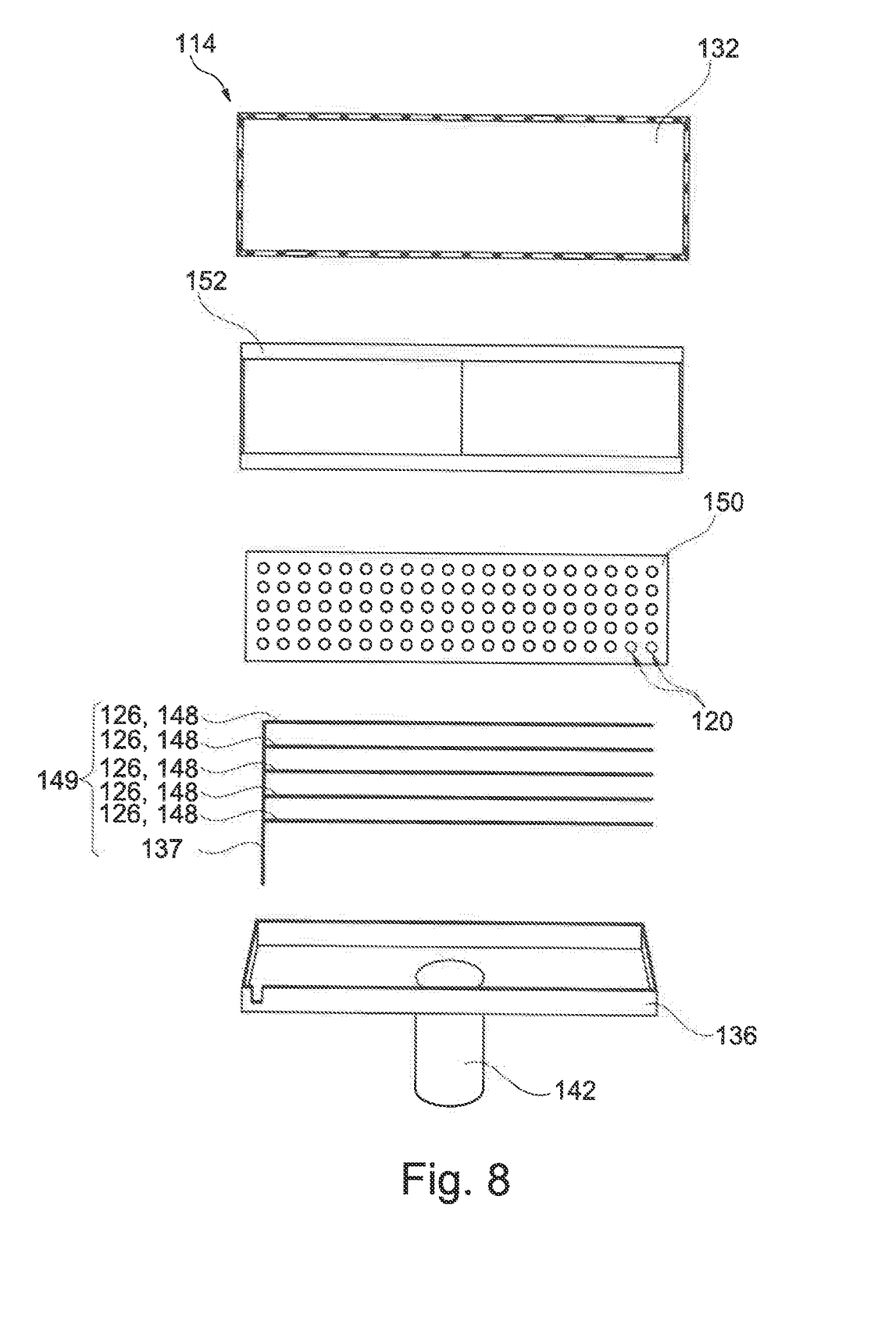
FIG. 8 shows an additional embodiment of a burner system according to the disclosure in the disassembled state.

In FIG. 8, a further embodiment of the burner system 114 is shown that substantially corresponds to the previous embodiment so that only the differences are discussed hereinafter and the same and functionally equivalent parts are provided with the same reference signs.

Half shells are not used in this embodiment, but rather the fuel channels 126 are provided in a component that is separate from the openings 120.

Each of the fuel channels 126 is formed as a separate pipe that is welded together with the fuel inlet 137 to form a channel component 149.

Separate from this, the openings 120 for the fresh air are formed in a perforated metal sheet 150 that can be located above the pipe construction 148.

Moreover, a separate frame 152 is provided for supporting the stabilization element 112 above the metal sheet 150.

The channel component 149, the metal sheet 150 and the frame 152 are attached in the housing 136, on which the crucible base 132 is provided on its upper side.

The pipes 148, the pipe construction 148, the metal sheet 150, the frame 152 and the housing 136 are welded parts and/or bent sheet metal parts that are more expensive to produce in contrast to the deep-drawn parts of the previous embodiment.

Of course, individual features of the various aspects can be combined with each other.

The invention claimed is:

1. A burner system for a cooking device, comprising a fuel supply and a first burner surface for the combustion of fuel that is provided downstream of the fuel supply, wherein a first air supply is provided upstream of the first burner surface, wherein the burner system comprises a second burner surface for afterburning that is separate from the first burner surface and is provided downstream from the first burner surface, wherein a second air supply is provided upstream of the second burner surface to supply air to the second burner surface.

2. The burner system according to claim 1, wherein at least one of the first burner surface and the second burner surface is provided with a catalyst material.

3. The burner system according to claim 1, wherein an ignition electrode is provided on the first burner surface for igniting the fuel.

4. The burner system according to claim 1, wherein an exhaust chamber is configured between the first burner surface and the second burner surface, wherein the second air supply opens into the exhaust chamber.

5. The burner system according to claim 1, wherein several first burner surfaces are provided which are covered by the second burner surface.

6. The burner system according to claim 1, wherein the first burner surface is part of a radial burner or part of a surface burner.

7. The burner system according to claim 1, wherein at least one of the first burner surface and the second burner surface is configured on a burner body.

8. The burner system according to claim 7, wherein the burner system comprises a cylindrical housing with two end faces and the first burner body is also configured cylindrically within the housing, wherein a space is configured between the first burner body and the housing.

9. The burner system according to claim 8, wherein the fuel supply opens into the space.

10. The burner system according to claim 8, wherein the housing is closed at the downstream end face by the second burner surface.

11. The burner system according to claim 8, wherein the second air supply is provided centrally on the upstream end face of the housing.

12. The burner system according to claim 1, wherein the burner system comprises a distribution plate.

13. The burner system according to claim 12, wherein the second burner surface constitutes the distribution plate.

14. A method for operating a burner system for a cooking device, wherein fuel is combusted on a first burner surface of the burner system, wherein a first air supply is provided upstream of the first burner surface and exhaust gases generated during combustion are afterburned on a second burner surface of the burner system, wherein air is supplied to the second burner surface for afterburning.

15. The method according to claim 14, wherein the amount of heat usable for cooking is controlled by the amount of air supplied for afterburning.

16. The method according to claim 14, wherein a catalyst material provided on at least one of the first burner surface and the second burner surface enables complete combustion at lower temperatures than would be the case without the catalyst material.

* * * * *